Figure 6:
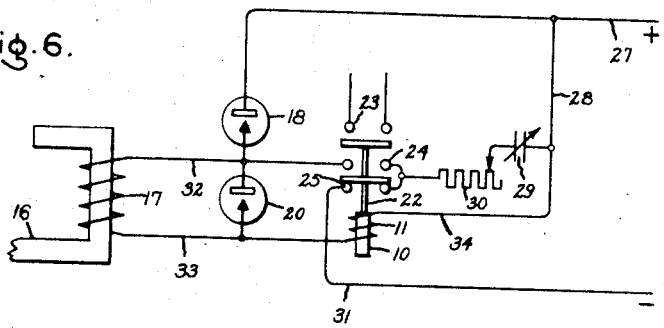

Sept. 16, 1941.                C. D. HAYWARD                    2,256,251
           DEVICE RESPONSIVE TO SUDDEN CHANGES IN ELECTRIC CIRCUITS
                        Filed June 2, 1939            2 Sheets-Sheet 1
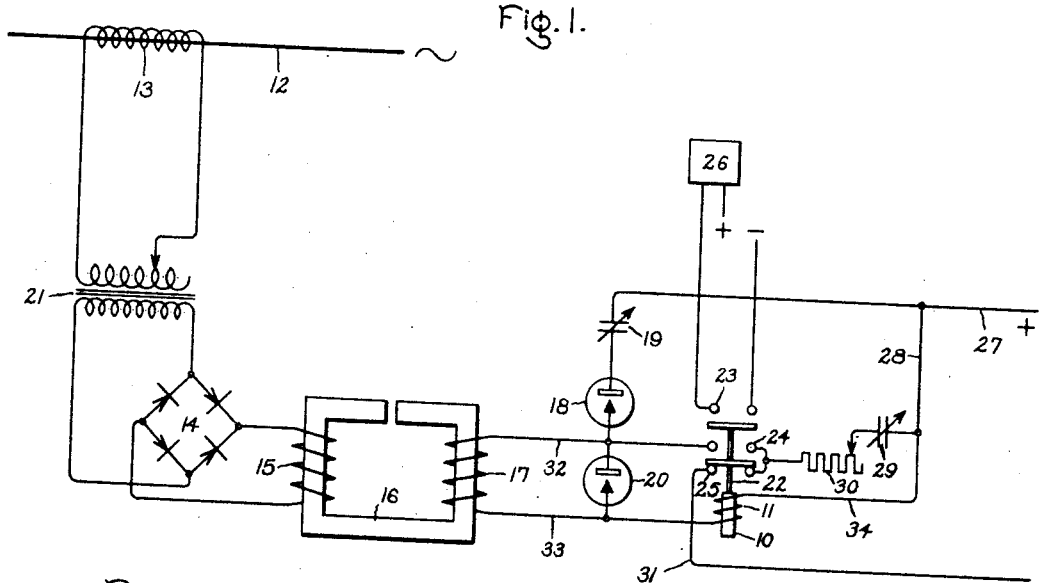
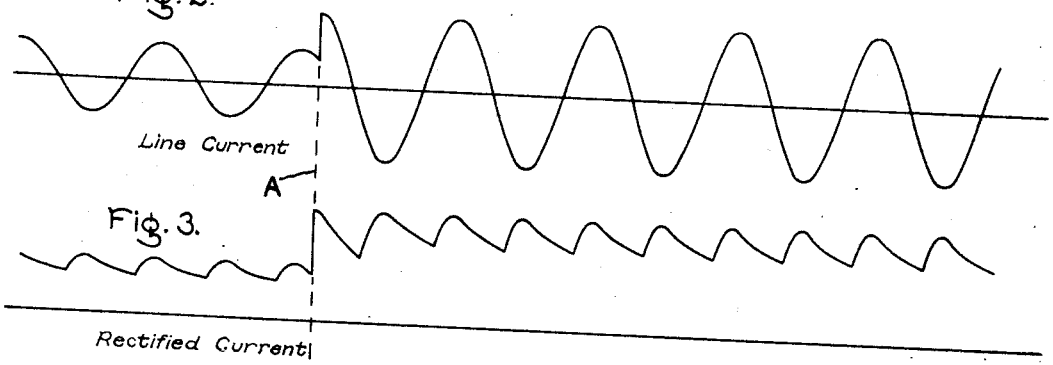
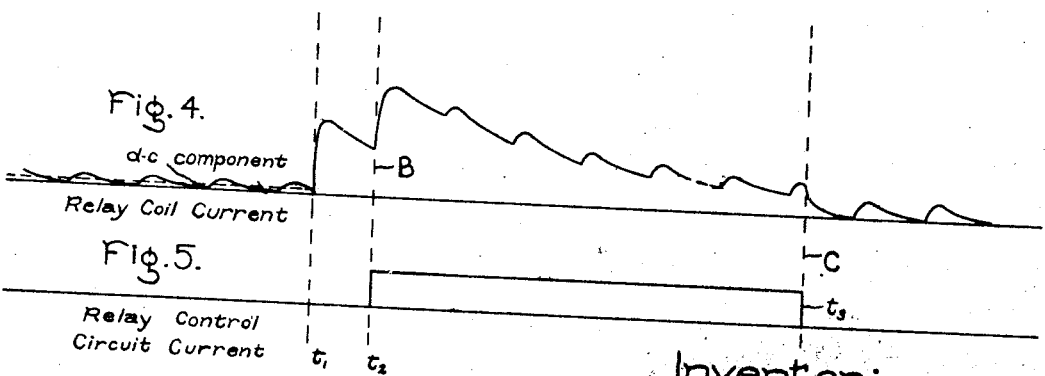
Inventor:
Claude D. Hayward,
by Harry E. Dunbar
His Attorney.

Sept. 16, 1941.                C. D. HAYWARD                    2,256,251
             DEVICE RESPONSIVE TO SUDDEN CHANGES IN ELECTRIC CIRCUITS
                              Filed June 2, 1939              2 Sheets-Sheet 2

Inventor:
Claude D. Hayward,
by Harry E. Dunham
His Attorney.

Patented Sept. 16, 1941

2,256,251

UNITED STATES PATENT OFFICE 2,256,251

DEVICE RESPONSIVE TO SUDDEN CHANGES IN ELECTRIC CIRCUITS

Claude D. Hayward, Lansdowne, Pa., assignor to General Electric Company, a corporation of New York Application June 2, 1939, Serial No. 277,013

16 Claims. (Cl. 175—294)

My invention relates to improvements in devices responsive to sudden changes in electric circuits, and more particularly to relaying devices which operate in dependence on the rate and magnitude of change of the effective value of an alternating current. One object of my invention is to provide an improved electroresponsive device which is sensitive to sudden changes in an alternating current without responding falsely when the rate and magnitude of change of the current are below given values. Another object of my invention is to provide an improved electroresponsive device which, having operated in response to a predetermined rate and magnitude of change in an alternating current, will remain in the operated condition to effect a desired controlling action requiring more time for its completion than the duration of the sudden current change. A further object of my invention is to provide an improved sudden change responsive device which is relatively simple in construction and operation and which can be easily assembled from relatively inexpensive commercially available components. These and other objects of my invention will appear in more detail hereinafter.

In the protection of power supply and distribution circuits for electric railway systems there arises the problem of distinguishing between heavy loads, such as occur in starting trains, especially after restoration of electric service following an interruption therein, and faults, such as short-circuits. The characteristics of most protective relays, for example distance relays, are such that they cannot distinguish between such heavy loads and faults and unnecessary service interruptions are likely to occur. In order to avoid these, it is desirable to set such protective relays so that they will not operate on heavy loads but in case of faults will automatically have their characteristics so changed as properly to respond and effect a clearing of the fault. Inasmuch as the faults are usually accompanied by sudden changes in current whereas in heavy loads the changes are much more gradual, this provides a criterion for more effective protection if a satisfactory device for such discrimination is available. In accordance with my invention, I provide an electroresponsive relay device which discriminates between sudden changes in current, such as accompany faults, and the slower changes or the sudden changes of relatively small magnitude which accompany loads. Electroresponsive devices embodying my invention may then be used to control the characteristics of protective relays, such for example as distance relays, by introducing more impedance or resistance in the voltage circuits of the ohm and starting units of the relay or by changing taps on small auxiliary transformers supplying the voltage coils of these units of the relay so as to render it more sensitive, when sudden current changes exceeding a predetermined magnitude occur, than is normally the case. My invention, however, is not limited in its scope of application to the relaying system just described.

My invention will be better understood from the following description when considered in connection with the accompanying two sheets of drawings, and its scope will be pointed out in the appended claims.

Figure 7:
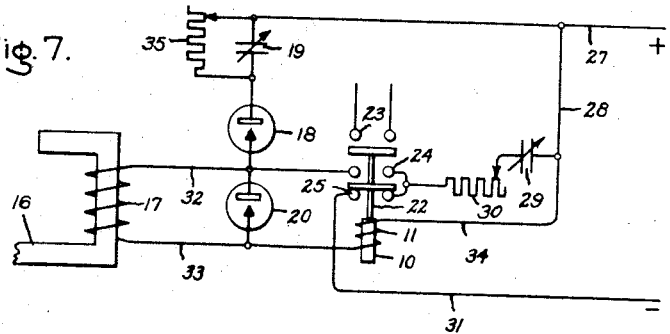
Figure 8:
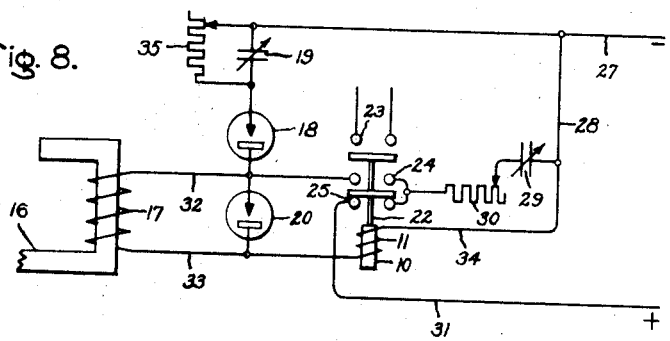
Figure 9:
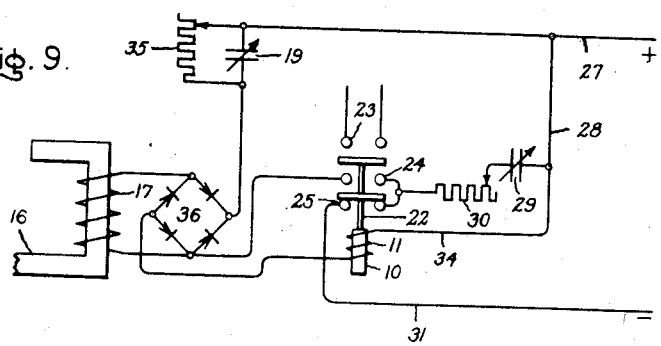

In the accompanying drawings, Fig. 1 illustrates diagrammatically an embodiment of my invention in a device responsive to a predetermined increase in magnitude of an alternating current at a rate of change above a predetermined value; Figs. 2, 3, 4, and 5 are current wave diagrams explanatory of my invention; Fig. 6 illustrates diagrammatically another embodiment of my invention; and Figs. 7, 8, and 9 illustrate diagrammatically modifications of the embodiment of my invention shown in Fig. 1.

In the embodiment of my invention shown in Fig. 1 an electroresponsive device which may be of a relatively simple type, such for example as an electromagnetic means or relay 10 having an actuating winding 11, is to be operated in response to a predetermined change in magnitude at a rate of change above a predetermined value of an alternating current assumed to be energizing a circuit, such as a power line conductor 12. In order to obtain the desired operation in accordance with my invention, I take a sample of the line current through suitable means, such as a current transformer 13. This sample of current, which is proportional to the line current, is then rectified by suitable rectifying means 14 shown as full wave. The rectified current thus obtained is supplied to one winding 15 of a two winding transformer 16 whose core is designed to provide substantially constant mutual magnetic coupling between the two windings. The other winding 17 includes in series relation therewith an electric valve means 18, suitable impedance means, such as a condenser 19, which may be adjustable as indicated, and the actuating winding 11 of the relay 10. If the relay 10 is to respond only to an increase in current, then the electric valve means 18 should pass current in only the direction which corresponds to an increase in the effective value of the current in the line conductor 12 as shown in Fig. 1.

With this arrangement, it is desirable to have a relatively low impedance path in case of a sudden decrease of the current in the line conductor 12. Accordingly, I may connect across the winding 17 of the transformer 16 a one-way electric valve means 20 which acts as a bypass for current waves appearing in the transformer winding 17 in consequence of a sudden decrease of the current in the conductor 12. If the current transformer 13 is of the usual type employed in the protection of alternating current circuits and it is desired to use, for example dry disk type rectifiers in the rectifying means 14, then an intermediate step down current transformer 21 may be used to bring the sample current in line with the rating of commercially available rectifiers. One of the windings of this transformer may be conveniently provided with taps, as indicated schematically, for adjusting the current value required to operate the relay 10.

As shown, the movable circuit controlling member 22 of the relay 10 is arranged to control two sets of circuit closing contacts 23 and 24 and one set of circuit opening contacts 25. The circuit closing contacts 23 may be in the circuit of any device 26 whose operation is to be modified or effected in response to a sudden change in the current in the conductor 12. Thus, for example, the device 26 may be a circuit breaker trip coil, an indicating or alarm device, or it may include an arrangement for changing the distance sensitivity of response of a distance relay, etc.

Since the current impulse which effects the operation of the relay 10 is of only momentary duration, I provide means for maintaining the relay 10 in the actuated position long enough to insure a completion of the controlling operation started by the relay. As shown, this means includes a suitable time constant circuit normally energized from a D. C. source and including conductors 27 and 28, a condenser 29, which may be adjustable, as indicated, a leak resistance 30, which may also be adjustable, as indicated, the normally closed circuit opening contacts 25 of the relay 10 and a conductor 31. When the relay 10 operates and closes its contacts 24, the charge on the condenser 29 leaks off in a circuit including the relay contacts 24, a conductor 32, the transformer winding 17, a conductor 33, the relay winding 11, a conductor 34, the condenser 29 and the resistance 30.

Referring now to Figs. 2–5, inclusive, the alternating line current is shown in Fig. 2 with a moderate initial value, as appears at the left of the dotted line A, corresponding, for example, to a steady load current. At some instant $t_1$, indicated by the dotted line A, this current suddenly increases to a large value, as shown at the right of the broken line A, due, for example, to the occurrence of a fault on the system of which the line conductor 12 is a part. As shown in Fig. 1, the line current, or more correctly a current proportional thereto, is rectified by the rectifier 14 and supplied to the winding 15 of the impulse transformer 16. The wave form of the rectified current is shown in Fig. 3. It will be observed that its otherwise pulsating wave form is smoothed to a moderate ripple by the action of the inductance of the impulse transformer 16 previously to the instant $t_1$ and again at a higher level shortly thereafter. At the instant $t_1$ the rectified current suddenly increases by an amount corresponding to the increase in the line current.

This sudden increase induces a pulse of current in the circuit of the winding 17 of the impulse transformer 16. If this increase is sufficiently great, it will effect the operation of the relay 10.

The ripple in the rectified current shown at the left of the line A in Fig. 3 induces a similar ripple in the circuit of the winding 17 of the impulse transformer 16. This ripple, supplied through the rectifiers 18 and 20, causes a series of half-wave pulses to flow in the winding 11 of the relay 10. The inductance of this winding tends to smooth these pulses and to cause more or less direct current to circulate in the relay coil through the rectifier 18. This circulating current is proportional to the initial load current, and since it aids the induced pulse in picking up the relay, it causes a drooping pick-up increment-load characteristic. In other words, a smaller increment of current tends to cause pick up when the initial load current is high than when it is low. Blocking this circulating direct current by the condenser 19 tends to cause the pick-up increment-load characteristic to rise because the aiding effect of this circulating current is absent and also because the consequent increase in flux in the impulse transformer core tends to cause partial saturation. The wave of the relay coil current, shown in Fig. 4, shows the cyclic pulses and the small D. C. component due to the initial load.

At the instant $t_1$ the impulse induced by the input current increment causes the relay 10 to pick up and close its contacts at an instant $t_2$ indicated by the dotted line B, as shown in Fig. 4. The closing of the contacts 24 connects the condenser 29 from the station battery supply where it has been kept charged, as previously pointed out, to the relay winding 11. This causes a second pulse of current to appear in the wave of the coil current, as shown immediately to the right of the line B in Fig. 4. This, of course, decays exponentially, as shown, at a rate controlled by the resistance 30. When the relay coil current has decayed to a certain value, the relay drops out again at an instant $t_3$, indicated by the dotted line C. The operation of the relay main circuit closing contacts 23 is illustrated by the wave of the relay control circuit current, shown in Fig. 5, between the instants $t_2$ and $t_3$ on the assumption, of course, that the control circuit does not include any contacts other than the relay contacts 23.

In the event that a falling pick-up increment-load characteristic is desired, that is, the relay 10 is to pick up on a smaller increment of current when the initial load current is high than when it is low, then the condenser 19, shown in Fig. 1, may be eliminated as illustrated in Fig. 6. However, it is more commonly desired to have the pick-up increment-load characteristic substantially flat. This can be accomplished by connecting a resistance 35, which may be adjustable as indicated, in parallel with the condenser 18, as shown in the modifications of my invention illustrated in Figs. 7, 8, and 9. This combination for maintaining the pick-up of the relay 10 independent of the magnitude of the alternating current immediately preceding the occurrence of a sudden change therein is disclosed and claimed in a copending application of Douglas E. Mode, Serial No. 277,014, filed June 2, 1939, and assigned to the assignee of this invention.

In the modification of my invention shown in Fig. 7, as also in Figs. 1 and 6, the electric valves 18 and 20 are so connected and arranged that the relay 10 operates on a sudden increase in alternating current, that is, increasing a predetermined amount at a rate of change above a predetermined value. In the modification of my invention shown in Fig. 8 the one-way valves 18 and 20 are so connected and arranged that the relay 10 operates on a sudden decrease of alternating current, that is, decreasing a predetermined amount at a rate of change above a predetermined value. With this arrangement it is necessary to change the polarity of the connections of the D. C. source energizing the time constant circuit including the relay winding 11, the condenser 29 and the resistance 30.

In those cases where a response of the relay 10 is desired to both a sudden increase and a sudden decrease in alternating current, that is, increasing or decreasing a predetermined amount at a rate of change above a predetermined value, I may use a full wave rectifier 36 connected as shown in Fig. 9.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States, is:

1. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative when the current in said other winding is above a predetermined value to move said member from one position to another and means for permitting current flow in said coil in only one direction.

2. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative when supplied with current above a predetermined value to move said member from one position to another, and electrically energized means including said coil for maintaining the member in said other position for a predetermined time.

3. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative when supplied with current above a predetermined value to move said member from one position to another, and means including a rectifier in parallel with said other transformer winding and a rectifier in series with said other transformer winding and said coil for permitting current flow in said coil in only one direction.

4. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative when supplied with current above a predetermined value to move said member from one position to another, and means for permitting current flow in said coil only when the effective value of the alternating current is increasing.

5. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative when supplied with current above a predetermined value to move said member from one position to another, and means for permitting current flow in said coil only when the effective value of the alternating current is decreasing.

6. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative when supplied with current above a predetermined value to move said member from one position to another, and means including an electric valve for permitting current flow in said coil in only one direction.

7. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative when supplied with current above a predetermined value to move said member from one position to another, and means controlled by said member for maintaining said coil energized for a predetermined time to hold the member in said other position during said time.

8. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative when supplied with current above a predetermined value to move said member from one position to another, and means including a normally closed direct current circuit controlled by said member and a series condenser in said circuit for delaying the return of the member to its initial position for a predetermined time after the occurrence of the sudden change in the alternating current.

9. A device responsive to sudden changes in an alternating current comprising means for rectifying said current, a transformer comprising two windings one of which is connected to be energized by said rectified current, electromagnetic means comprising a coil connected to be energized from the other of said transformer windings, and electric valve means in circuit with said other winding and said coil for controlling the direction of flow of current in said coil in dependence on the change in magnitude and the rate of change of the alternating current supplied to said rectifying means.

10. A device responsive to sudden changes in an alternating current comprising means for rectifying said current, a transformer comprising two windings one of which is connected to be energized by said rectified current, electromagnetic means comprising a coil connected to be energized from the other of said transformer windings, and electric valve means in circuit with said other winding and said coil for effecting the operation of said electromagnetic means only when alternating current supplied to said rectifying means increases a predetermined amount at a rate of change above a predetermined value.

11. A device responsive to sudden changes in an alternating current comprising means for rectifying said current, a transformer comprising two windings one of which is connected to be energized by said rectified current, electromagnetic means comprising a coil connected to be energized from the other of said transformer windings, and electric valve means in circuit with said other winding and said coil for effecting the operation of said electromagnetic means when alternating current supplied to said rectifying means decreases a predetermined amount at a rate of change above a predetermined value.

12. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative to move said member from one position to another when alternating current supplied to said rectifying means has a predetermined change in magnitude at a rate of change above a predetermined value, and electric valve means in circuit with said actuating coil for permitting the operation of said device on both an increase and a decrease in the alternating current.

13. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative to move said member from one position to another when alternating current supplied to said rectifying means has a predetermined change in magnitude at a rate of change above a predetermined value, and electric valve means in circuit with said actuating coil for limiting operation of said device only to a decrease in the alternating current.

14. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative to move said member from one position to another when alternating current supplied to said rectifying means has a predetermined change in magnitude at a rate of change above a predetermined value, and electric valve means in circuit with said actuating coil for limiting operation of said device only to an increase in the alternating current.

15. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative to move said member from one position to another when alternating current supplied to said rectifying means has a predetermined change in magnitude at a rate of change above a predetermined value, and a condenser and electric valve means in series relation with each other in the circuit of said actuating coil.

16. A relay system for controlling a circuit breaker comprising an electric circuit, a transformer whose primary is in series relation with said circuit, an electromagnetic device for tripping said circuit breaker energized from the secondary of said transformer, and an asymmetric conductor in circuit with said device to preclude tripping of said circuit breaker for one sense of change in magnitude of unidirectional current traversing said transformer secondary.

CLAUDE D. HAYWARD.